United States Patent
Subramanian et al.

(10) Patent No.: US 7,021,147 B1
(45) Date of Patent: Apr. 4, 2006

(54) SENSOR PACKAGE AND METHOD

(75) Inventors: Kanakasabapathi Subramanian, Clifton Park, NY (US); Donald Joseph Buckley, Jr., Schenectady, NY (US); Slawomir Rubinsztajn, Schenectady, NY (US); Arun Virupaksha Gowda, Schenectady, NY (US); Stanton Earl Weaver, Jr., Northville, NY (US); Russell William Craddock, Numeaton (GB); Deborah Ann Haitko, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/178,128

(22) Filed: Jul. 11, 2005

(51) Int. Cl.
*G01L 19/04* (2006.01)

(52) U.S. Cl. .................................................... 73/708

(58) Field of Classification Search .................. 73/706, 73/708, 715–728, 756
See application file for complete search history.

(56) References Cited

U.S. PATENT DOCUMENTS

| | | | |
|---|---|---|---|
| 4,686,764 A | 8/1987 | Adams et al. | |
| 4,732,042 A | 3/1988 | Adams | |
| 5,625,151 A | 4/1997 | Yamaguchi | |
| 5,682,594 A * | 10/1997 | Kennedy et al. | 428/549 |
| 6,509,423 B1 * | 1/2003 | Zhu | 525/478 |
| 6,798,072 B1 * | 9/2004 | Kajiwara et al. | 257/778 |
| 2004/0214377 A1 | 10/2004 | Starkovich et al. | |

* cited by examiner

*Primary Examiner*—William Oen
(74) *Attorney, Agent, or Firm*—William E. Powell, III; Christian G. Cabou

(57) ABSTRACT

A sensor package and method are described. The sensor package includes an enclosure, a diaphragm coupled to the enclosure. The diaphragm is configured to receive vibrations from an ambient environment. Further, the sensor package includes a pressure sensing element disposed inside the enclosure, and a pressure transfer medium disposed inside the enclosure and proximate the pressure sensing element, where the pressure transfer medium includes a fluid, and a plurality of filler particles suspended in the fluid. The filler particles serve to reduce a coefficient of thermal expansion of the pressure transfer medium.

23 Claims, 7 Drawing Sheets

SENSOR PACKAGE AND METHOD

BACKGROUND

The invention relates generally to a system and method for protecting a pressure sensing element from an ambient atmosphere whose pressure is being sensed. More particularly, the invention relates to a sensor package employing a pressure sensing element and method for manufacturing the sensor package.

Pressure sensors made of semiconductor materials are employed in a variety of applications because of their small size and compatibility with other electronic systems. Semiconductor pressure sensors or dies are generally used as pressure sensing elements in applications, such as combustion engines or in marine applications. For example, when employed in combustion engines, semiconductor pressure sensors are used to measure pressure variations in combustion fuel. However, semiconductor materials are sensitive to contamination caused by the harsh environment in such applications. Accordingly, if the surface of a semiconductor pressure sensor is exposed directly to an ambient environment whose pressure is being measured the pressure sensor may be adversely affected.

Therefore, typically pressure sensors are sealed in a metal container having a metal diaphragm which receives the pressure variations in the ambient environment and transfers it to the oils or fluids employed as a pressure transmitting medium, which in turn transfers the pressure to the pressure sensing element. This flow of pressure from the ambient environment to the diaphragm, and pressure transmitting medium and subsequently to the pressure sensor leads to measurement errors due to material mismatch. Also, due to wide temperature ranges involved in these applications, it is desirable to have a close match between the values of coefficient of thermal expansion (CTE) for the various materials involved, to prevent pressure fluctuations caused by thermal mismatch. For example, in case of an oil with high CTE, expansion of oil with temperature causes increased and undesirable stress on the diaphragm. Additionally, low CTE of the oil is desirable to reduce the errors from other components of the pressure sensor package, such as the diaphragm, from propagating to the sensing element. Hence, it is desirable to employ an oil which has a close CTE match with the other components of the assembly, such as diaphragm.

There exists a need for a suitable pressure transmitting medium which protects the pressure sensing element from the ambient environment without substantial loss in accuracy by having a close match of the CTE with other materials employed in the package.

SUMMARY

Embodiments of the invention are directed to a system and a method for protecting a pressure sensing element from an ambient atmosphere whose pressure is being sensed.

One exemplary embodiment of the invention is a sensor package. The sensor package includes an enclosure and a diaphragm coupled to the enclosure. The diaphragm is configured to receive vibrations from an ambient environment. Further, the sensor package includes a pressure sensing element disposed inside the enclosure and a pressure transfer medium disposed inside the enclosure and proximate the pressure sensing element. The pressure transfer medium includes a fluid, and a plurality of filler particles suspended in the fluid. The filler particles serve to reduce a coefficient of thermal expansion of the pressure transfer medium.

Another exemplary embodiment of the invention is a fluidic medium having a coefficient of thermal expansion no greater than 500 ppm/° C. The fluidic medium comprises a fluid, and a plurality of filler particles suspended in the fluid. A coefficient of thermal expansion of the plurality of filler particles is no greater than about 5 ppm/° C.

Another exemplary embodiment of the invention is a method for manufacturing a sensor package that includes the steps of providing an enclosure having a base, coupling a pressure sensing element to the base, disposing a pressure transfer medium in the enclosure proximate the pressure sensing element, and disposing a diaphragm on the enclosure to seal the enclosure. A coefficient of thermal expansion of the pressure transfer medium is no greater than 500 ppm/° C.

These and other advantages and features will be more readily understood from the following detailed description of preferred embodiments of the invention that is provided in connection with the accompanying drawings.

DETAILED DESCRIPTION OF EXEMPLARY EMBODIMENTS

Figure 1:
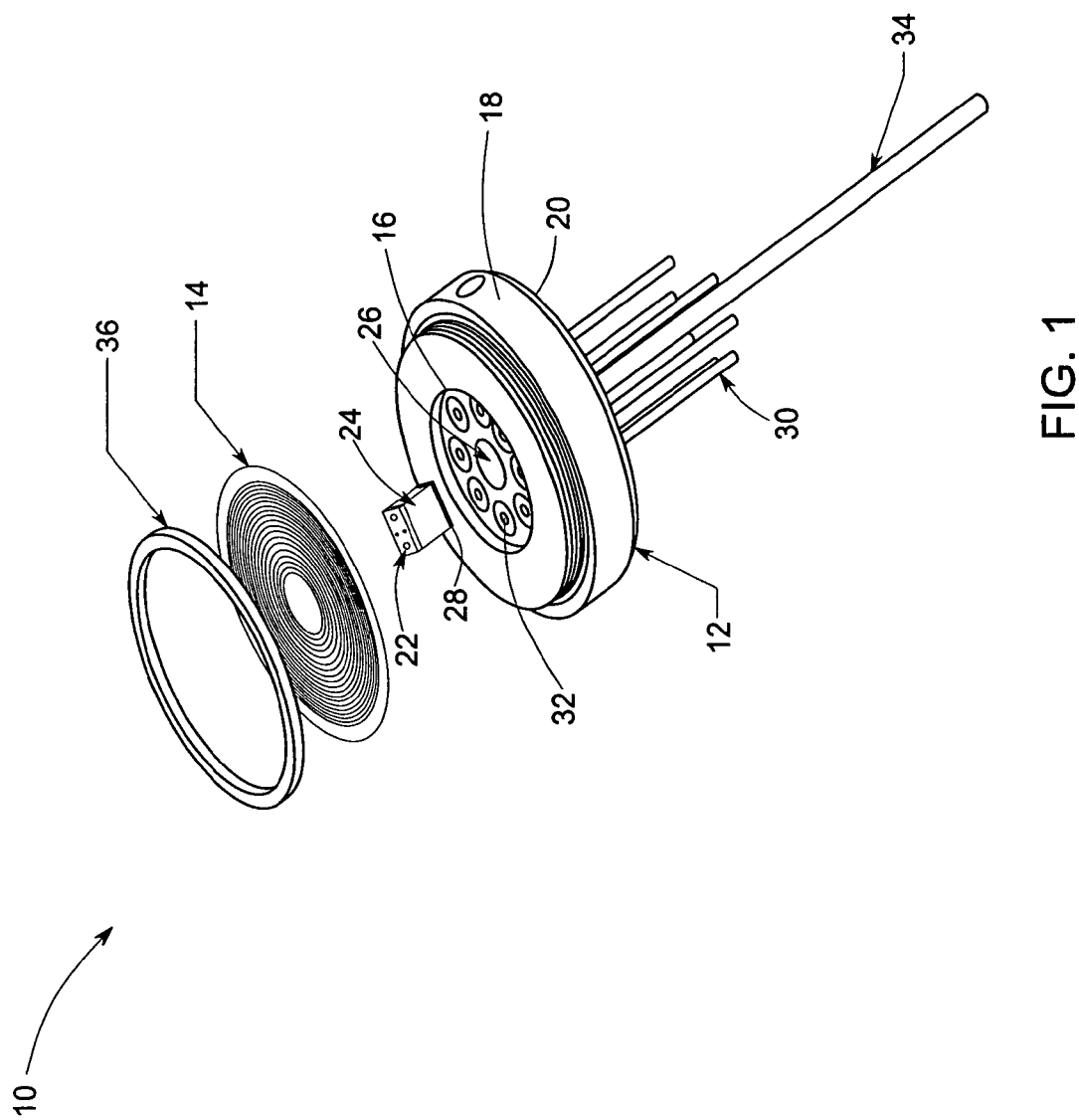
FIG. 1 is a perspective view of a sensor package in accordance with an exemplary embodiment of the present technique.
Figure 2:
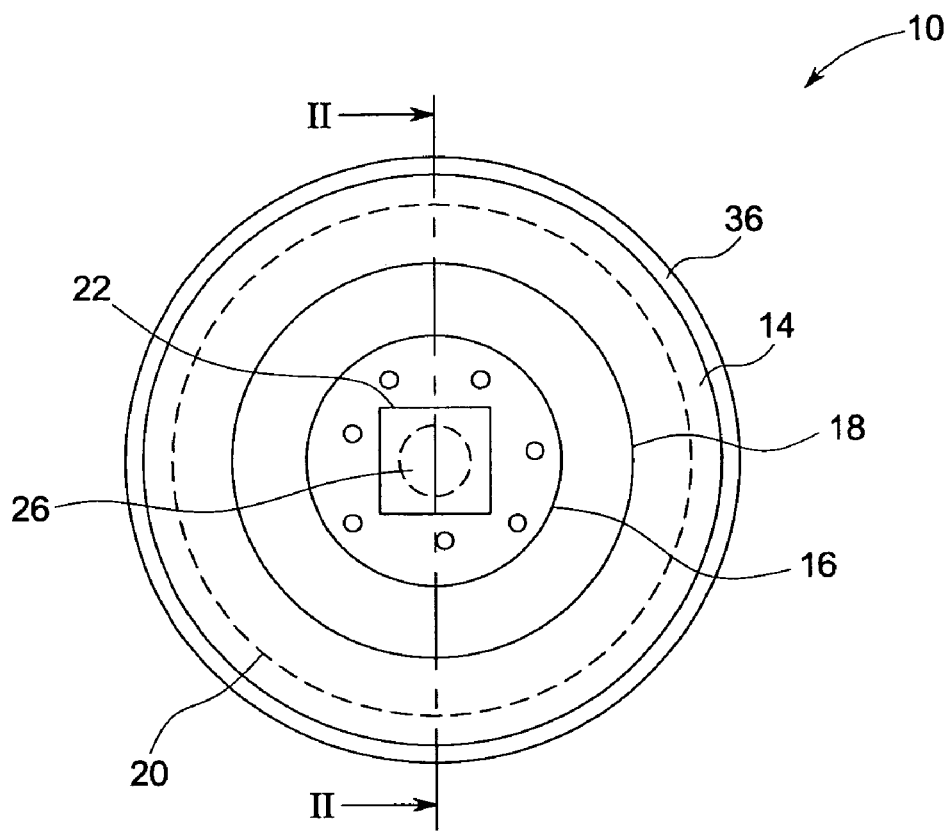
FIG. 2 is a top view of the sensor package of FIG. 1.
Figure 3:
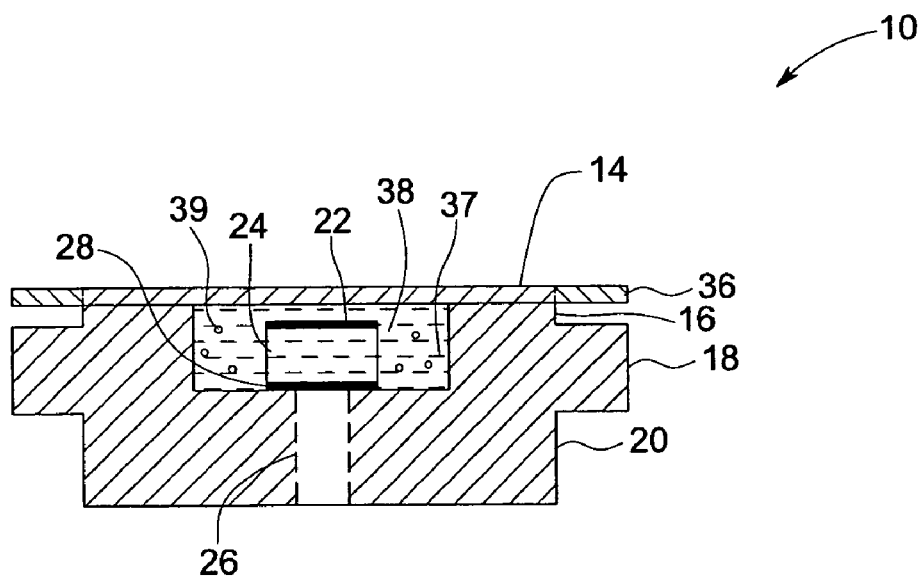
FIG. 3 is a cross-sectional side view of the sensor package of FIG. 1 taken along line II—II.

Referring now to FIGS. 1–3, a sensor package 10 is illustrated. The illustrated sensor package 10 includes an enclosure 12 coupled to a diaphragm 14. The illustrated enclosure 12 has a generally circular profile and includes an inner surface 16 and an outer surface 18. It should be appreciated that the configuration of the enclosure 12 may take any suitable form. Further, the enclosure 12 includes an extended portion 20, such that the extended portion has a diameter greater than the diameter of the inner surface 16, but smaller than the diameter of the outer surface 18. The enclosure 12 is employed to house a pressure sensing element 22 to isolate the pressure sensing element 22 from the harsh ambient environment. The sensor package 10 may be employed in, for example, automotive applications, process transmissions, aerospace applications, and depth measurements. The enclosure 12 and diaphragm 14 may be made of stainless steel in instances where the stainless steel is compatible with the ambient environment. In marine applications, such as depth measurements, the diaphragm 14 may be made of copper-nickel. In other applications, the diaphragm 14 may be made of tantalum. As will be appreciated, for the same amount of pressure, the sensor package 10 or the diaphragm 14 having a smaller diameter will experience relatively lesser amount of force as compared to the sensor package 10 or the diaphragm 14 having a larger diameter. Accordingly, in some cases the sensor package may have a diameter of less than about 25 mm. In these embodiments, the pressure values in the ambient environment may range to upto about 1500 psi. In some embodiments, the pressure sensing element 14 may include a resonant sensor. In an exemplary embodiment, the pressure sensing element 22 may include a microelectromechanical system (MEMS) device, such as, for example, a sensor. For some applications, the pressure sensing element 22 may include a semiconductor material such as silicon.

The pressure sensing element 22 is mounted on a substrate 24, such as a glass substrate, and disposed in a cavity 26 located within the inner surface 16 of the enclosure 12. Typically, an adhesive layer 28 is employed to couple the glass substrate 24 to the enclosure surface around the cavity 26. In other words, the adhesive layer 28 is disposed between the glass substrate 24 and the enclosure material. In some embodiments, the adhesive layer 28 may include an epoxy. It should be appreciated that silicon and glass have a relatively close CTE match. Hence, no operational limitations are generated by simultaneous use of silicon and glass. However, the pressure variations seen by the pressure sensing element 22 lead to development of stress between the pressure sensing element 22 and the glass substrate 24. Also, the pressure sensing element 22 faces interfacial stresses generated due to the bonding between the adhesive layer 28 and materials having dissimilar coefficient of thermal expansions (CTEs). Accordingly, as described in detail with respect to FIGS. 4–8, the glass substrate 24 may include a block, or may include columnar structures, or other shapes.

The sensor package 10 employs leads 30 disposed within sockets 32 adjacent the cavity 26 and within the inner surface 16. The leads 30 are employed to electrically couple the pressure sensing element 22 to an output device, such as a display. The leads 30 are electrically coupled to an external or internal electrical source. The sensor package 10 further has a reference tube 34 protruding out from the bottom of the enclosure 12. The reference tube 34 serves to ground the sensor package 10.

As will be appreciated, the diaphragm 14 is configured to receive vibrations from an ambient environment. The received vibrations are then passed on to a pressure transmitting medium, such as a pressure transfer medium or a fluidic medium 38 (FIG. 3) disposed inside an internal hollow 37 in the enclosure 12 housing. For some applications, the ambient environment of the enclosure 12 is harsh for the pressure sensing element 22, making it necessary to isolate the pressure sensing element 22 from the ambient environment. The pressure sensing element 22 is housed in a closed container, such as the enclosure 12 employing the diaphragm 14. The diaphragm 14 communicates with the pressure sensing element 22 through the fluidic medium 38 (FIG. 2). As will be appreciated, the pressure transfer medium 38 is employed to transfer the vibrations of the diaphragm 14 to the pressure sensing element 22. Accordingly, it is desirable to employ a pressure transfer medium 38, which does not contaminate the pressure sensing element and has such properties as a low coefficient of thermal expansion and a manageable viscosity. As will be appreciated, to avoid errors generated from the material mismatch, it is desirable to have relatively close match between the CTEs of the material of the diaphragm 14 and the pressure transfer medium 38. Typically, the diaphragm 14 includes stainless steel, which has a CTE varying in a range from about 10 to about 30 ppm/° C. Accordingly, it is desirable to have a low CTE for the pressure transfer medium. For example, the coefficient of thermal expansion of the pressure transfer medium is no greater than 500 ppm/° C. In some embodiments, the CTE of the pressure transfer medium is no greater than about 350 ppm/° C.

The pressure transfer medium or the fluidic medium 38 includes a fluid and a plurality of filler particles 39 (FIG. 3) suspended in the fluid. Typically, the CTE of the plurality of filler particles 39 is significantly lower than the CTE of the fluid. Sometimes the CTE of the plurality of filler particles 39 may even be a negative value. Specifically, the CTE of the plurality of filler particles is no greater than 5 ppm/° C., whereas the CTE of the fluid may be of the order of 900 ppm/° C. or higher. It should be appreciated that the presence of the plurality of filler particles 39 in the fluidic medium 38 serves to tailor the CTE of the fluidic medium 38 by reducing the overall CTE of the fluidic medium 38, thereby matching it more closely to the other components of the sensor package 10, such as pressure sensing element 22 and the diaphragm 14. The fluid in the fluidic medium 38 may include silicone oil or polyethylene glycol blends. The plurality of filler particles 39 may include fused silica particles, colloidal silica particles, organofunctionalized colloidal silica particles, hollow spheres of glass, solid spheres of glass, alumina particles, titania particles, zirconium tungstate particles, or combinations thereof.

In the illustrated embodiment of FIG. 1, the diaphragm 14 employs a diaphragm ring 36, which may serve to secure the diaphragm 14 to the enclosure 12. In other embodiments, the diaphragm ring 36 may have a diameter smaller than the diameter of the diaphragm and may be employed co-centrically above the diaphragm 14 such that when the diaphragm 14 deflects due to the expansion of the fluidic medium 38, the diaphragm 14 comes in contact with the diaphragm ring 36 and the stress experienced by the diaphragm is distributed.

It may be desirable to prevent sedimentation of the filler particles 39 suspended in the fluid in the fluidic medium 38. It should be appreciated that rate of sedimentation is directly proportional to the size and density of the particles. Accordingly, to inhibit sedimentation of the filler particles 39, the size of the plurality of filler particles 39 should be no greater than 20 microns. The size of the plurality of filler particles 39 also may be varied depending on its density. In other words, particles 39 having a higher density may be employed in smaller sizes, and particles 39 having relatively lesser density may be employed in larger sizes. In an exemplary embodiment, the fluid includes a silicone oil and the plurality of filler particles include a mixture of fused combination of solid and hollow spheres of glass. In some embodiments, the separation time (time for sedimentation to occur) of the filler particles 39 from the fluid varies in a range from about 2 weeks to about 5 weeks at standard gravity.

Additionally, it is desirable to have a manageable viscosity for the fluidic medium 38 to enable reduced errors in the pressure readings taken by the pressure sensing element 22. Also, it is easier to fill the enclosure 12 when the fluidic medium has low viscosity, as the fluidic medium 38 is generally filled in the enclosure 12 by means of a small cavity. Suspending more filler particles 39 in the fluid, in other words, loading the fluid beyond a certain value especially at low temperatures, may adversely affect the viscosity of the fluidic medium 38, which in turn may affect the pressure readings indicated by the pressure sensing element 22. It is desirable to have a fluidic medium 38 that is incompressible and inseparable in a temperature range of about 125° C. to about −55° C.

Additionally, the plurality of filler particles 39 of the fluidic medium 38 may be functionalized to achieve desirable properties, such as increased hydrophobicity, low CTE, and better compatibility with the fluid. For example, filler particles 39 that are sized in the nanoscale range may be functionalized by treatment with organosilanes to make them relatively more hydrophobic. In another example, the plurality of filler particles 39 may be functionalized using organoalkoxysilanes, organochlorosilanes or organosilazanes; or combinations thereof to further lower the CTE of the plurality of filler particles 39.

The glass substrate 24 may include a block, or may include columnar structures, or other shapes to mount the pressure sensing element 22 and also to be coupled to the adhesive layer 28. FIGS. 4–8 illustrate different embodiments of a glass substrate, which are employed in the sensor package 10 to reduce the stress in the sensor package 10. In these illustrated embodiments, the glass substrate employs columnar structures, which may be coupled to the pressure sensing element 22 and/or the adhesive layer 28. With specific reference to FIG. 4, a glass structure 40 includes a base 42 divided into an array of pixels 44. The array of pixels 44 employs columns 46 in a triangular pattern to reduce the stress in the pressure sensing element 22. Referring to FIG. 5, an alternate glass structure 48 including a base 50 employing a columnar structure is illustrated. The base 50 is divided into array of pixels 52. Further, the glass structure 48 employs four columns 54 positioned at four corners of the rectangular base 50.

Figure 5:
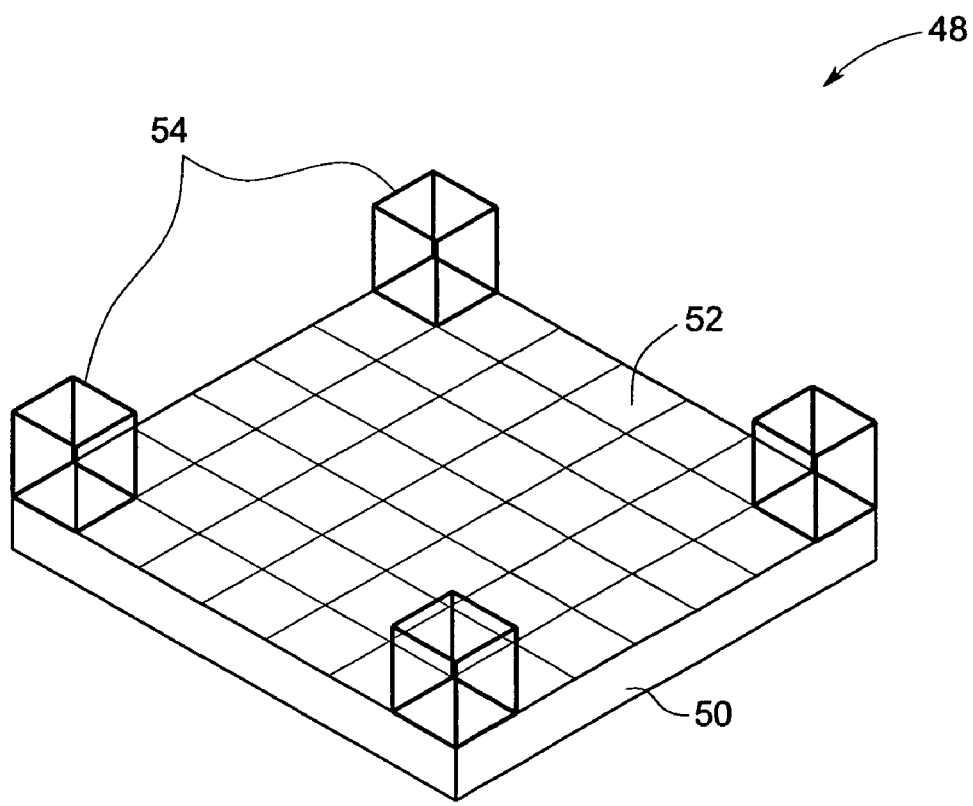
FIG. 5 is a perspective view of a glass substrate employing columnar structures in accordance with another exemplary embodiment of the present technique.
Figure 6:
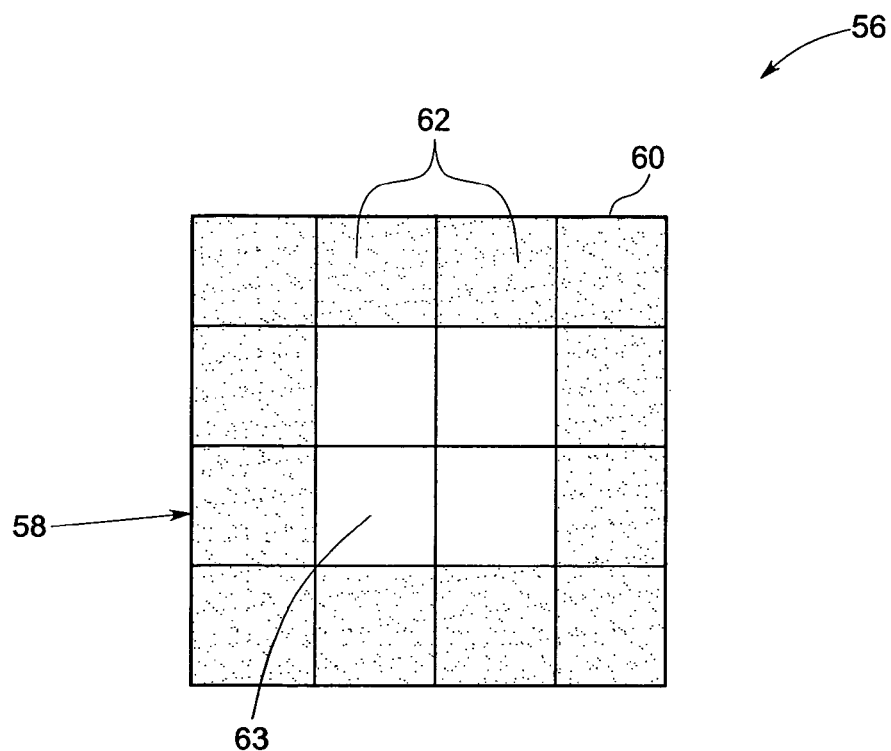
FIG. 6 is a top view of a glass substrate employing columnar structure in accordance with an exemplary embodiment of the present technique.
Figure 7:
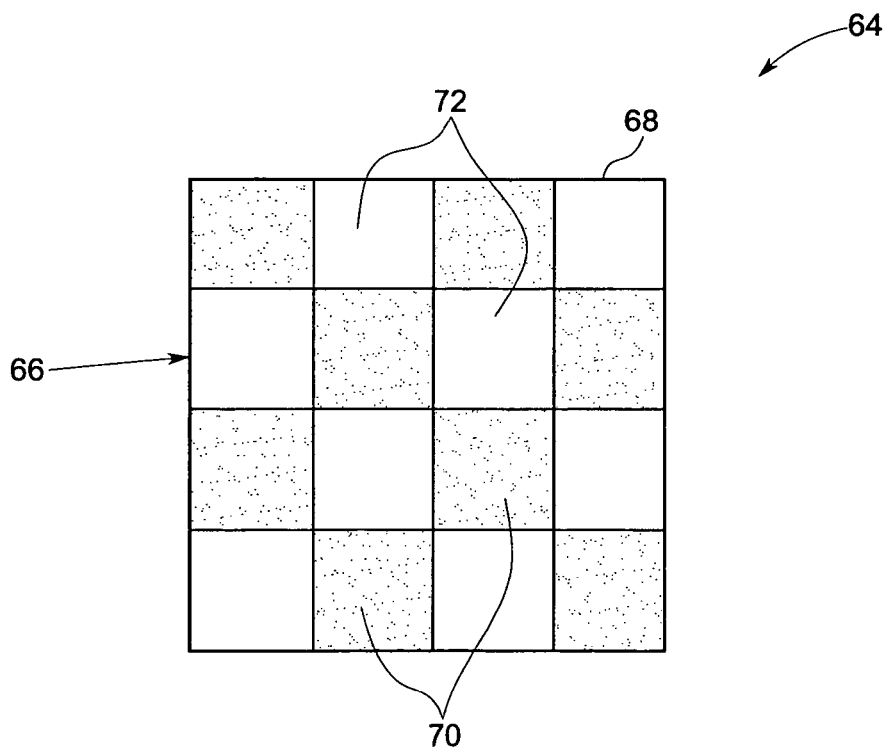
FIG. 7 is a top view of a glass substrate employing columnar structure in accordance with another exemplary embodiment of the present technique.

Similarly, in FIG. 6 the structure 56 employing a glass substrate 58 is illustrated. The glass substrate 58 is divided into an array of pixels 60. For the reasons of simplicity, in FIGS. 6 and 7 the structures 56 and 64 are illustrated as top views as compared to perspective views of structures 40 and 48 in FIGS. 4 and 5. In the illustrated embodiment, the columns 62 are disposed on the pixels located at the perimeter of the array of pixels 60, and the pixels 63 of the array of pixels 60 are empty. It should be appreciated that although in the illustrated embodiment, the array of pixels 60 displays evenly sized pixels, as will be appreciated, the size and shape of the individual pixels may vary. Next, with reference to FIG. 7 a structure 64 having a glass substrate 66 divided into an array of pixels 68 is illustrated. The glass substrate 66 employs columns 70 positioned at alternate pixels of the array of pixels 68 leaving pixels 72 empty. The illustrated structure 64 may be used either to support the pressure sensing element 22 or to be coupled with the adhesive layer 28.

Figure 4:
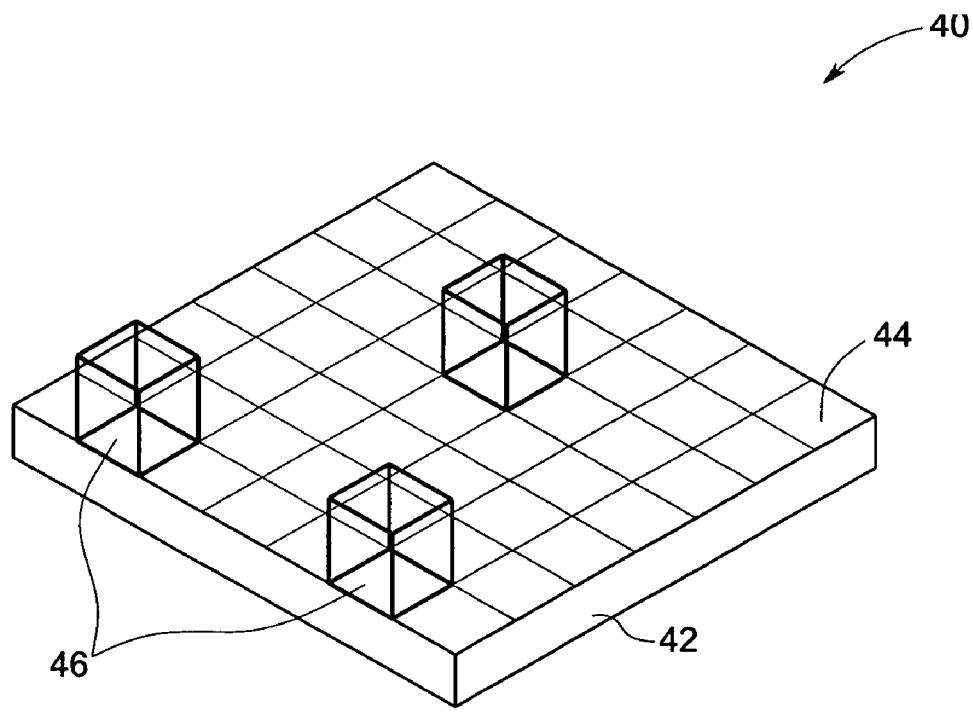
FIG. 4 is a perspective view of a glass substrate employing columnar structures in accordance with an exemplary embodiment of the present technique.
Figure 8:
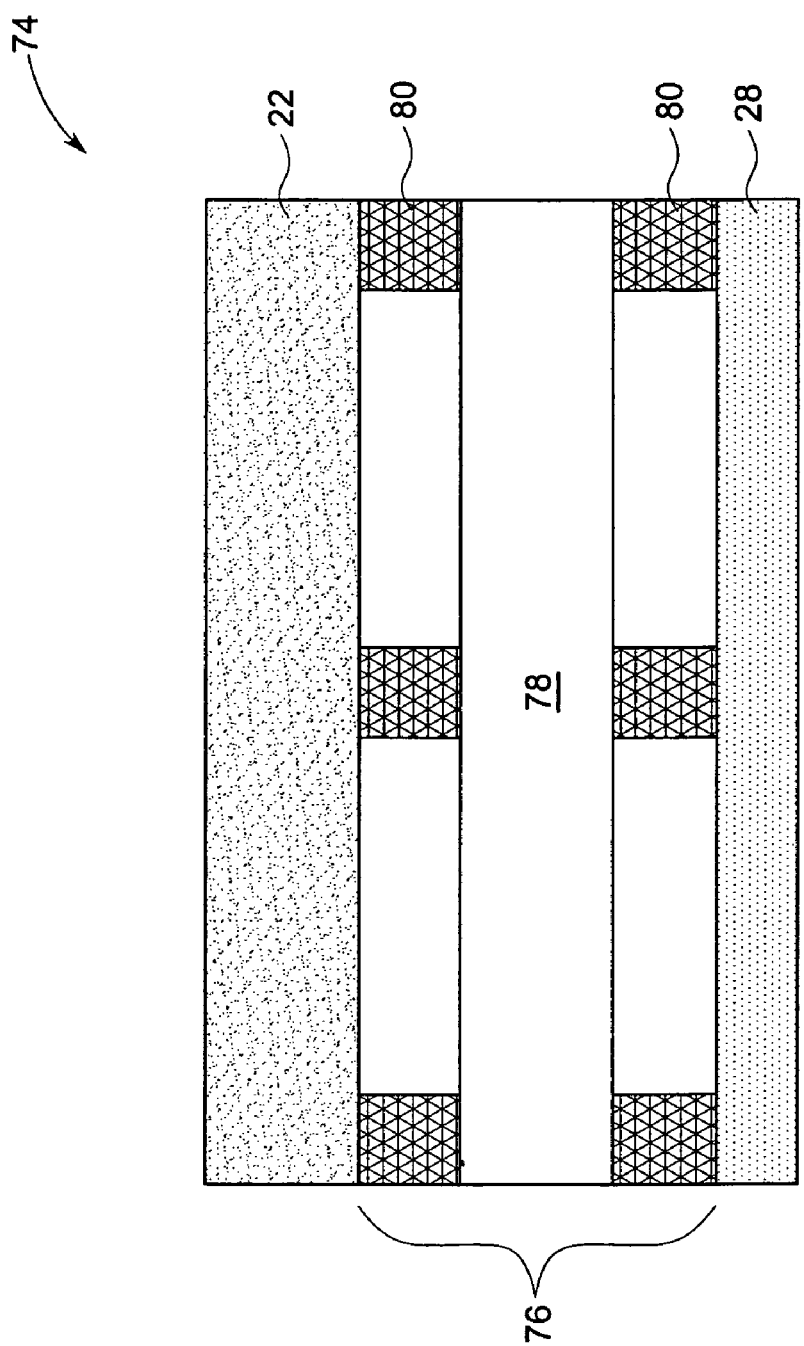
FIG. 8 is a cross-sectional side view of a glass substrate employing columnar structure in accordance with an exemplary embodiment of the present technique.

FIG. 8 illustrates a glass structure 74 with a two-tier structure 76 of a glass substrate 78 employing the triangular pattern of FIG. 4. In the illustrated embodiment, columns 80 are present on either side of the base 78. Furthermore, the structure 74 includes an adhesive layer 28 disposed between the two-tier structure 76 and a metal base around the cavity 16.

In addition to the geometry of the glass substrate, various other factors such as thickness of the adhesive layer 28 and hardness of the adhesive layer 28 may also contribute to the stress experienced by the pressure sensing element 22. The adhesive layer 28 may have a thickness varying in a range from about 5 mils to about 15 mils. Specifically, the thickness of the adhesive layer may be around 10 mils.

Figure 9:
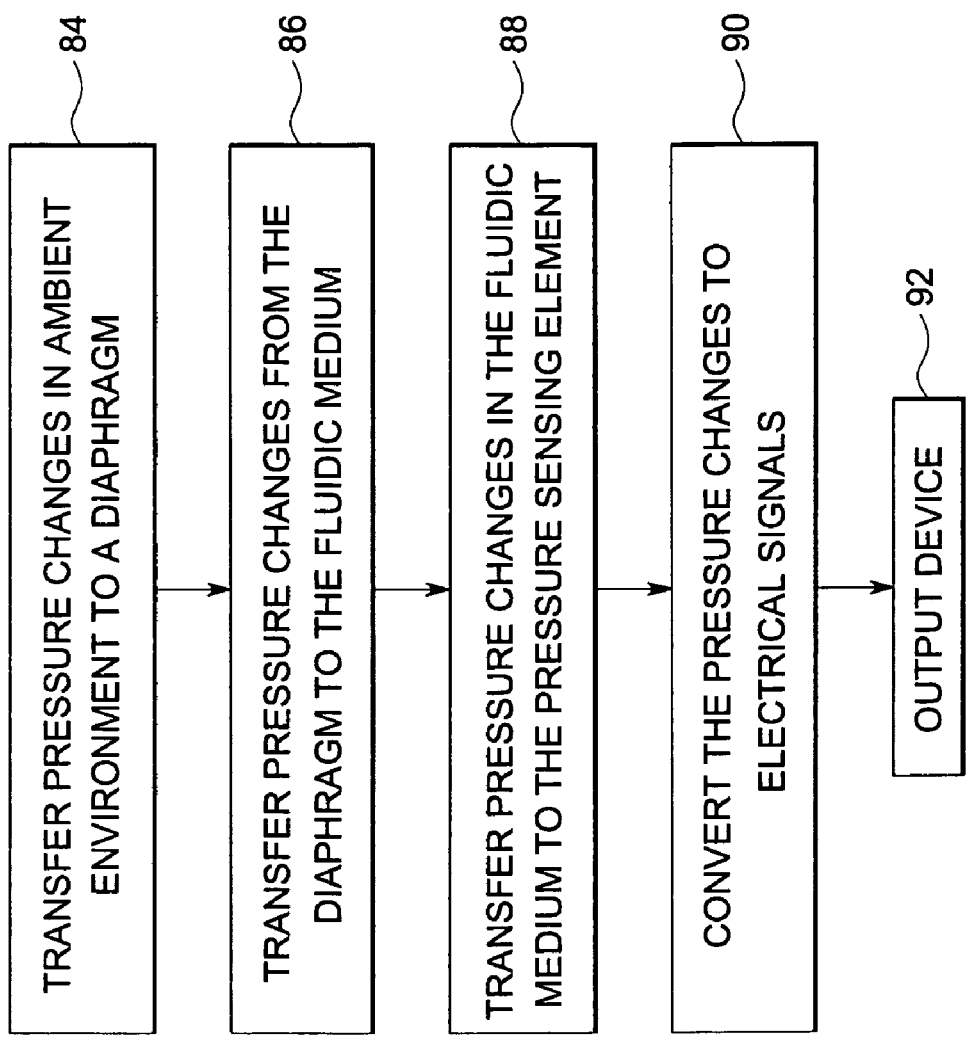
FIG. 9 is a flow chart illustrating a method of displaying pressure changes in ambient environment on an output device by using a pressure sensing element in accordance with an exemplary embodiment of the present technique.

With reference to FIG. 9, next will be described a method for displaying pressure changes taking place in an ambient environment surrounding the sensor package 10 (FIGS. 1–3) onto an output device. At Step 84, pressure changes taking place in the ambient environment are transferred onto the diaphragm 14 of the enclosure 12. Upon experiencing the pressure changes of the ambient environment, the diaphragm generates vibrations. At Step 86, the vibrations generated in the diaphragm 14 are transmitted to the fluidic medium 38 in the form of pressure changes. At Step 88, the fluidic medium 38 transmits these pressure changes to the pressure sensing element 22 to be sensed and quantified. At Step 90, the pressure changes sensed/experienced by the pressure sensing element 22 are then converted into signals, such as electrical signals. At Step 92, the electrical signals are displayed on an output device such as, a monitor.

Figure 10:
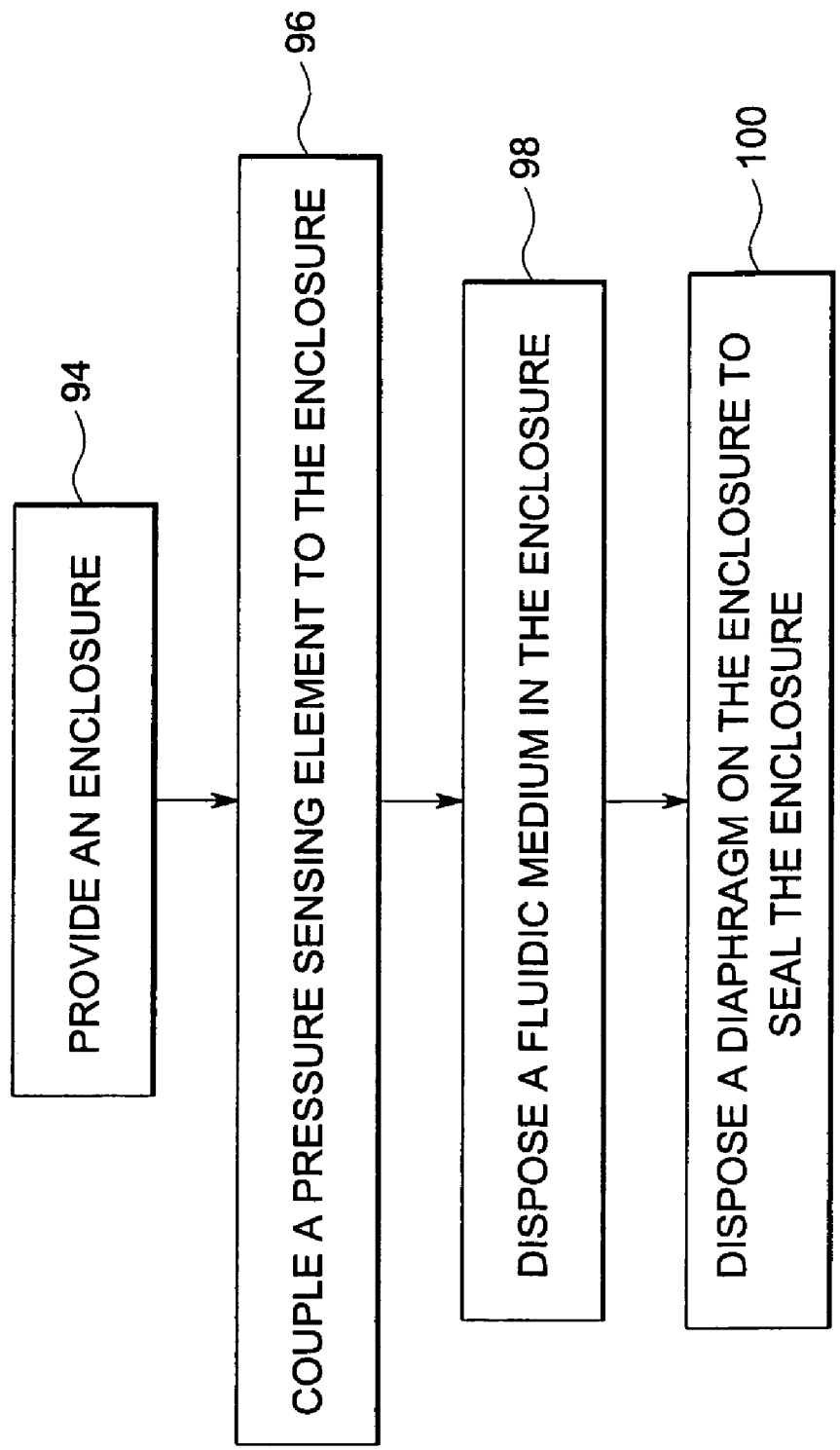
FIG. 10 is a flow chart illustrating a method of manufacturing a sensor package in accordance with an exemplary embodiment of the present technique.

With reference to FIG. 10, next will be described a method for manufacturing a sensor package 10 of the present technique. At Step 94, an enclosure 12 is provided, as mentioned above, the enclosure 12 may include stainless steel. At Step 96, a pressure sensing element 22 is disposed inside the enclosure 12. As discussed above with reference to FIGS. 1, 2 and 3, the pressure sensing element 22 is mounted on a substrate, such as a glass substrate 24 and coupled to the substrate using an adhesive layer 28. At Step 98, a fluidic medium 38 is disposed inside the enclosure 12, proximate the pressure sensing element 22. As discussed in detail above, the fluidic medium includes a fluid having a plurality of filler particles suspended therein. At Step 100, the diaphragm 14 is disposed on the enclosure 12 to enclose the enclosure 12 to shield the pressure sensing element 22 from the harsh ambient environment.

EXAMPLE 1

Various fluidic mediums having filler particles of different commercial grades of fused silica or glass suspended in different commercial grades of silicone oil were prepared as mentioned in the table 1 below. Table 1 provides the list of various silicone oils and name and amount of filler particles, which were added in 100 grams of the listed silicone oils to make the fluidic medium. The various grades of silicone oils used for the purpose of the experiment are mentioned in Table 1, all the silicone oils were manufactured by GE Silicones at Waterford, N.Y. Similarly, various grades of commercially available filler particles were employed, the fillers particles were manufactured by Denka Corp. Tokyo, Japan. 100 grams of silicone oil was charged to a mixer Ross Mixer (Hauppauge, N.Y. 11788) equipped with steam heated jacket and vacuum port. For all the samples prepared, a predetermined amount of filler particles was divided into three portions. The three portions were added to the silicone oil at room temperature one at a time and the mixture was mixed for 5 minutes after each addition. After the addition of the filler particles, the mixture was stirred at room temperature for 15 minutes. Subsequently, the mixture was heated in vacuum for one hour to 100° C. Then the fluidic medium was cooled down to the room temperature.

Hg Pressure to obtain a final weight of 84 grams of the clear dispersion. During the removal of the last portion of solvent from the dispersion, rapid agitation is desirable to prevent agglomeration of silica. Two sets of experimental data was gathered by mixing the 50 wt. % dispersion with one of the three solvents, poly-(ethylene glycol) (PEG), Dow Corning 550(SP-1) (DC550) and Service Pro 6012 (SP6012) to make blends or fluidic medium.

In the first set, the 115 ml of one of the solvents PEG, DC550, or SP6012 were mixed with 50 wt. % dispersion in appropriate ratio to prepare blends as summarized in Tables 2. This combined solution was subjected to rotary evaporation at 100° C. and about 10 mm Hg for 2 hours to remove the 1-methoxy-propane-2-ol solvent. CTE measurements were made following this reduction.

TABLE 1

| Filler Particles/ Silicone Oil | SR83-061A | SR83-061B | SR83-053A | SR83-053B | SR83-053C | SR83-053D | SR83-038C | SR83-038D |
|---|---|---|---|---|---|---|---|---|
| Sphericel 110P8/gm | 150.0 | 150.0 | — | — | — | — | — | — |
| Sphericel 110P8 by volume | 136.4 | 136.4 | — | — | — | — | — | — |
| FB-5LDX/gm | — | — | 250.0 | 247.0 | 270.0 | 248.5 | 240.0 | — |
| FB-5LDX by volume | — | — | 113.6 | 112.3 | 122.7 | 113.0 | 109.1 | — |
| FB570 | — | — | — | — | — | — | — | 240.0 |
| Fumed silica 88318 | — | — | — | 3.0 | — | 1.5 | — | — |
| SF96-100/gm | 100.0 | 70.0 | 70.0 | 70.0 | 68.0 | 70.0 | 72 | 72 |
| % wt/wt solids | 60 | 70 | 78 | 78 | 80 | 78 | 77 | 77 |
| % vol solids | 60 | 70 | 60 | 60 | 64 | 60 | 60 | 60 |

| Apperance | flowable | flowable | flowable | semi solid | flowable | Flowable/high visc | flowable | flowable |
|---|---|---|---|---|---|---|---|---|
| Separation | yes | yes | no | no | no | no | no | yes |
| Viscosity at RT | 9420 | | | | | | | 25400 |
| Viscosity at −56 C. | 49800 | | | | | | | 70500 |
| CTE/ppm | 435 | | 430 | | 377 | | 350–476 | |

EXAMPLE 2

1035 grams of isopropanol (Aldrich, Milwaukee, Wis. 53233) was mixed with 67 grams of Snowtex OL (Nissan, Chemical, Houston, Tex., 77042) having 21 weight percent silica to form a dispersion. Further, 20.1 grams of trimethoxy benzene (Aldrich, Milwaukee, Wis. 54481) was added and the dispersion was stirred and heated at a temperature varying from about 70° C. to about 80° C. for about 1–2 hours. The dispersion was then cooled and stored for about 2 hours before completing the preparation of the concentrated dispersion.

Further, 540 grams of the aliquot of the dispersion having 42 grams nanosilica was diluted with 750 grams of 1-methoxy-2-propanol to form a relatively clear dispersion. The clear dispersion was then concentrated by employing rotary evaporation at the temperature of about 60° C. per at 60 mm

TABLE 2

| Fluidic Medium | 50 wt % dispersion (mL) | wt % nano-slica in DC550 | Density of Blend (gm/cc) | Low Temp. (° C.) | High Temp. (° C.) | CTE (ppm/° C.) |
|---|---|---|---|---|---|---|
| K120-1/SP6012 | 115.00 | 39.25 | 1.25 | 6 | 45 | 779 |

Alternatively, in the second set of experiments, 50 wt. % sol of the nanosilica particles was mixed in appropriate amounts with one of the three fluids, PEG, DC550, or SP6012, such that the total volume of the fluidic medium was 115 mil. These samples were subjected to CTE measurements without evaporation. These blends are summarized in Table 4.

TABLE 3

| Fluidic Medium | Vol. of Fluid | Vol. of Filler Particles | Low Temp. (° C.) | High Temp. (° C.) | CTE (ppm/° C.) |
|---|---|---|---|---|---|
| K78-1-DC550 + 2:1 nano silica/50 wt. % in 1MeO-2-PrOH | 76.67 ml of DC550 | 38.33 ml | 5.3 | 21.8 | 799 |
| K82-1-SP6012 Brake Fluid + 2:1 Nano Silica sol | 76.67 ml of SP6012 | 38.33 ml | −1.8 | −4.6 | 555 |
| K89-3-PEG + nanosilica sol 4:1 | 92 ml of PEG | 23 ml | 6.3 | 45.4 | 722 |
| K102-1-PEG Control | | | 6.2 | 46.9 | 696 |
| K102-2-SP6012 Control | | | 6.1 | 45.4 | 779 |
| DC550-DC 550 Control measured 7/04 | | | 5.2 | 43.9 | 761 |

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while the sensor package is described in conjunction with automotives applications, process transmitters, aerospace applications, and depth measurements, it should be appreciated that the sensor package may find utility for any application in which a pressure difference in an ambient environment is transferred from the environment through the diaphragm onto the pressure sensing element, such as, for example, in flow sensing. Additionally, while various embodiments of the invention have been described, it is to be understood that aspects of the invention may include some of the described embodiments. Accordingly, the invention is not to be seen as limited by the foregoing description, but is only limited by the scope of the appended claims.

What is claimed as new and desired to be protected by Letters Patent of the United States is:

1. A sensor package, comprising:
   an enclosure;
   a diaphragm coupled to said enclosure, wherein said diaphragm is configured to receive vibrations from an ambient environment;
   a pressure sensing element disposed inside said enclosure; and
   a pressure transfer medium disposed inside said enclosure and proximate said pressure sensing element, said pressure transfer medium comprising:
   a fluid; and
   a plurality of filler particles suspended in said fluid, wherein said filler particles serve to reduce a coefficient of thermal expansion of said pressure transfer medium.

2. The sensor package of claim 1, wherein said enclosure and said diaphragm comprise stainless steel.

3. The sensor package of claim 1, wherein a coefficient of thermal expansion of said pressure transfer medium is no greater than 500 ppm/° C.

4. The sensor package of claim 1, wherein said fluid comprises silicone oil.

5. The sensor package of claim 1, wherein said fluid comprises polyethylene glycol.

6. The sensor package of claim 1, wherein a coefficient of thermal expansion of said plurality of filler particles is no greater than about 5 ppm/° C.

7. The sensor package of claim 1, wherein said plurality of filler particles comprises fused silica particles, colloidal silica particles, organofunctionalized colloidal silica particles, hollow spheres of glass, solid spheres of glass, alumina particles, titania particles, zirconium tungstate particles or combinations thereof.

8. The sensor package of claim 1, wherein a size of said plurality of particles is no greater than about 20 microns.

9. The sensor package of claim 1, wherein said pressure sensing element comprises a resonant sensor.

10. The sensor package of claim 9, wherein said pressure sensing element comprises a micro electromechanical system.

11. A fluidic medium having a coefficient of thermal expansion no greater than 500 ppm/° C., comprising:
   a fluid; and
   a plurality of filler particles suspended in said fluid, wherein a coefficient of thermal expansion of said plurality of filler particles is no greater than about 5 ppm/° C.

12. The fluidic medium of claim 11, wherein a viscosity of said fluidic medium is in a range from about 5 centipoises to about 1000 centipoises.

13. The fluidic medium of claim 11, wherein a separation time of said fluid and said plurality of filler particles is in a range from about 2 weeks to about 5 weeks at standard gravity.

14. The fluidic medium of claim 11, wherein said fluidic medium is incompressible and inseparable in a temperature range from about 125° C. to about −55° C.

15. The fluidic medium of claim 11, wherein said fluid comprises a silicone oil.

16. The fluidic medium of claim 11, wherein said fluid comprises a polyethylene glycol.

17. The fluidic medium of claim 11, wherein said plurality of filler particles comprises fused silica particles, colloidal silica particles, organofunctionalized colloidal silica particles, hollow spheres of glass, solid spheres of glass, alumina particles, titania particles, zirconium tungstate particles or combinations thereof.

18. The fluidic medium of claim 11, wherein a size of said plurality of filler particles is no greater than about 20 microns.

19. A method of manufacturing a sensor package, comprising:
   providing an enclosure having a base;
   coupling a pressure sensing element to said base;
   disposing a pressure transfer medium in said enclosure proximate said pressure sensing element, wherein a coefficient of thermal expansion of said pressure transfer medium is no greater than 500 ppm/° C.; and disposing a diaphragm on said enclosure to seal said enclosure.

20. The method of claim 19, wherein said step of disposing said pressure transfer medium comprises:

providing a fluid; and suspending a plurality of filler particles in said fluid, wherein a coefficient of thermal expansion of said plurality of filler particles is no greater than about 5 ppm/° C.

21. The method of claim 19, wherein said step of coupling said pressure sensing element comprises disposing an epoxy between said pressure sensing element and said base.

22. The method of claim 19, further comprising functionalizing said plurality of filler particles.

23. The method of claim 22, wherein said step of functionalizing comprises treating said plurality of filler particles with organosilane.

* * * * *